United States Patent [19]

Wirz

[11] 4,186,847

[45] Feb. 5, 1980

[54] METHOD AND APPARATUS FOR DEFLECTING A STREAM OF SPREADABLE PARTICLES

[75] Inventor: Walter Wirz, Thalwil, Switzerland

[73] Assignee: Dr. Peter Fahrni, Kilchberg, Switzerland

[21] Appl. No.: 678,230

[22] Filed: Apr. 19, 1976

[30] Foreign Application Priority Data

Apr. 24, 1975 [CH] Switzerland ......................... 5258/75

[51] Int. Cl.2 ............................................... B65G 31/04

[52] U.S. Cl. ........................................ 222/1; 222/410; 198/525; 241/188 R

[58] Field of Search ........................... 222/414, 410, 1; 118/308; 241/93, 188 R; 198/525, 533, 642; 209/285, 288

[56] References Cited

U.S. PATENT DOCUMENTS

| | | | |
|---|---|---|---|
| 2,131,128 | 9/1938 | Thornton | 241/93 |
| 2,336,873 | 12/1973 | Lindberg | 241/93 X |
| 3,411,724 | 11/1968 | Noe | 241/188 R |
| 3,487,911 | 1/1970 | Wirz | 222/410 X |

*Primary Examiner*—Robert J. Spar
*Assistant Examiner*—Frederick R. Handren
*Attorney, Agent, or Firm*—Anthony J. Casella

[57] ABSTRACT

An apparatus for deflecting a stream of spreadable particles comprises a rotatable hollow cylinder having a perforated circumferential shell through which the particles normally pass. The apparatus further comprises means for controlling the operating conditions of the cylinder whereby the particles fed to the circumferential shell of the cylinder can no longer pass therethrough, but are impelled in a different direction. The method for deflecting the particles comprises the steps of closing the passage openings of the cylinder during its rotary movement, reversing the direction of rotation of the cylinder and increasing the speed of rotation of the cylinder. The spreading operation may be monitored by positioning means for capturing the deflected particles adjacent the periphery of the spreading device. The deflected particles may then be transported by conveying means to an appropriate measuring device.

1 Claim, 2 Drawing Figures

METHOD AND APPARATUS FOR DEFLECTING A STREAM OF SPREADABLE PARTICLES

BACKGROUND OF THE INVENTION

The present invention relates to a method of deflecting a stream of spreadable particles such as wood chips in a particle dispensing device having a rotating drivable hollow cylinder, the perforated circumference of which is normally passed through twice by the particles before they can fall in a fan-like stream, onto a support which is moved relative to said cylinder. Spreading machines having one or more hollow cylinders, are used for the forming of particle-board mats or blanks. These cylinders, which are frequently referred to as cage cylinders, have the job of defelting and uniformly distributing the particulate material. These particles are normally not identical to each other. Generally the material consists of a mixture of relatively coarse and fine particles.

Temporary deflection of the stream of particles, which is sometimes desired in a plant, poses a problem. This is so particularly when the stream of particles, which is controlled as a function of a physical variable, is to be fed periodically or sporadically during a test discharge period into a measuring device, so that the weight of the particles discharged by the spreading machine per unit of time can be monitored.

It has been customary for many years to check periodically, in the manner indicated, the uniformity of the operation of the spreading device which discharges the particles in measured quantities onto moving plates or a conveyor belt. Up to now this has been done by interrupting the formation of the mat, for instance, once an hour, for a few seconds, conducting all of part of the stream of particles to a collecting device, which is temporarily placed below the spreading device. The chips collected in this manner are fed by suitable means of conveyance, to a scale which indicates deviations from the proper weight and/or automatically readjusts the spreading device, if necessary.

This process has the disadvantage that it is necessary in each case to bring the relatively bulky collecting device into its operating position and, after the test-discharge period, to bring it back into a position in which it does not interfere with the normal spreading process. This time consuming and cumbersome manipulation not only makes operation difficult but it also increases the standstill time of the plant while the spreading is being tested.

It is also customary to arrange collecting means, for collecting the spread particles during the test discharge interval, below the following press plates on which mats are formed by the spreading of particles. These collecting means may in this connection be a conveyor belt traveling transversely to the direction of movement of the mats, said belt feeding the collected particles to the measuring device. Of course, with such a process, a test spreading is only possible if a certain minimum distance is present between the spread supports. The method accordingly cannot be used in the case of continuous spreading supports.

The object of the present invention is to provide a method for deflecting a stream of spreadable particles which is simple and rational and is adapted, for instance, to be carried out in a plant for the formation of a mat of wood particles, for the temporary deflection of the stream of chips in order to monitor the manner of operation of the plant. The above-described deficiencies should in particular be eliminated in this connection. This goal can be achieved, in accordance with the present invention, by changing the operating conditions of the cylinder, by closing the passage openings of the cylinder, by reversing its direction of rotation or by increasing its speed of rotation in such a manner that the particles rebound from the circumference of the rotating cylinder and are thrown by it in a direction which differs from the normal general direction of passage.

SUMMARY OF THE INVENTION

The new method of the subject invention is based on the realization, which has not been employed heretofore in this way, that a cage cylinder, serving as a rotating distributing element, can be employed in a manner different from its normal use, and serve as a throwing-off cylinder which does not permit the passage of the particles fed to it but impels them in a different direction. Due to this property of the cylinder, it is possible, in surprising fashion, to use the cylinder for different functions and in that way to obtain a rapid deflection of the stream of particles without the use of any other apparatus inserted in the stream of particles.

The invention extends, furthermore, to an apparatus for employing the new method. This apparatus in accordance with the invention has a rotatable hollow cylinder with a perforated circumferential wall, which forms a particle discharge device and, furthermore, means for controlling the operating conditions of the cylinder so that the particles which are fed to the cimcumference of the cylinder from the outside cannot pass through it but rebound and are impelled in a different direction.

The means for controlling the operating conditions could, for instance, be flat transverse bars arranged parallel to each other and forming the shell of the cage cylinder. The bars are adapted to be turned about their longitudinal axis by a control device and transmission means during the rotation of the cylinder, whereby the bars assume a position in which they impel the oncoming particles away instead of conducting them into the inside of the hollow cylinder. This could be a position in which the passage openings, normally present between the bars of the hollow cylinder, are closed. Furthermore, these means can also be developed in such a manner that they bring about an increase in the speed of rotation of the cylinder and/or a reversal of its direction of rotation.

The method and apparatus in accordance with the invention are explained below with reference to the drawings which show one illustrative embodiment of an apparatus for making a stream of wood particles uniform and distributing them onto a support which is moved at uniform speed below the apparatus.

DESCRIPTION OF THE PREFERRED EMBODIMENTS

Figure 1:
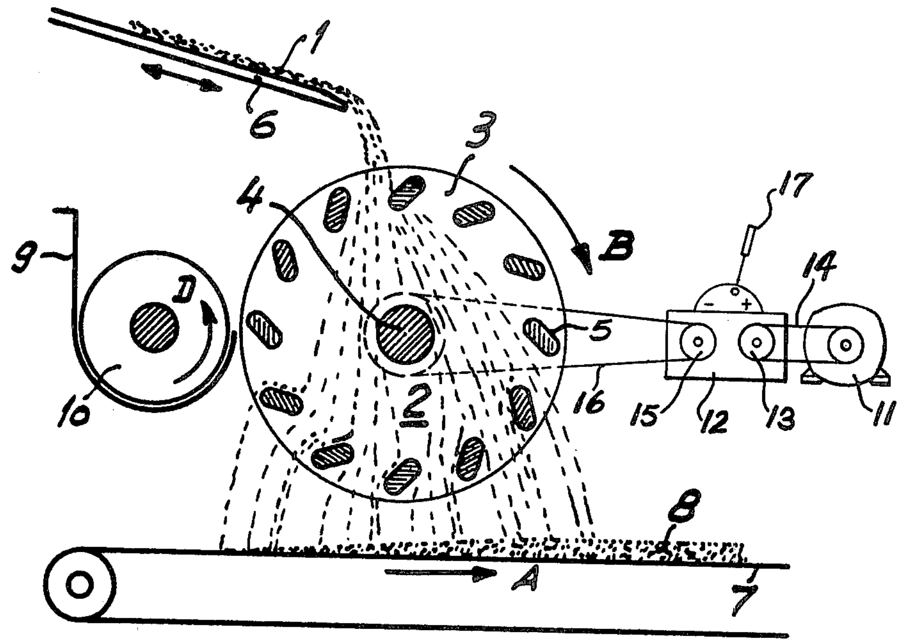
FIG. 1 is a diagrammatic sectional view of the apparatus during the spreading of the particles, i.e., during the normal operation of the hollow cylinder.

The function which is normally to be exercised by the apparatus of the subject invention is the loosening of a continuous stream 1 of wooden particles and distributing the particles as uniformly as possible on a conveyor belt 7 which is moved in the direction indicated by the arrow A. In this way a mat 8 is formed, which, thereupon, can be compressed in known manner with the use of heat to form particle boards. For this purpose, the particles are fed via a vibratory chute 6 to a cage cylinder 2, which rotates in the direction of the arrow B.

The cylinder 2 comprises two end flanges 3, a shaft 4 which, in the drawing, is continuous, and is driven by means not shown and is suitably supported; and a plurality of cross bars 5 connecting the two flanges 3. These bars 5, having a flattened cross-sectional profile are inserted and turned around their longitudinal axis in such a manner that their cross-sectional shape is in each case oblique with respect to a radius extending from the axis of rotation of the cylinder. Due to this development and arrangement of the transverse bars, there is obtained a greater shoveling effect, as a result of which the oncoming particles are conveyed particularly effectively into the inside of the hollow cylinder. An additional advantage is that the shovel-shaped transverse bars 5 result in a suction effect, so that the occurence of a vacuum due to the action of the centrifugal force within the cylinder is counteracted. The lack of uniformity upon the spreading observed heretofore, caused by such a vacuum can be thus avoided.

Directly adjacent the periphery of the hollow cylinder 2, preferably disposed approximately at the height of the shaft 4, there is provided an open trough 9 extending in the region of the cylinder and parallel to it, in which trough a conveyor worm 10 is contained. In the position shown in FIG. 1, this conveyor worm 10 normally has no function. It is, of course, possible, during the normal spreading process, to remove by means of the worm 10 any chip particles which may be thrown by the cage cylinder 2 in the direction of the trough and then transport them back to the storage particle bin. The worm then rotates in the direction indicated by the arrow D.

Figure 2:
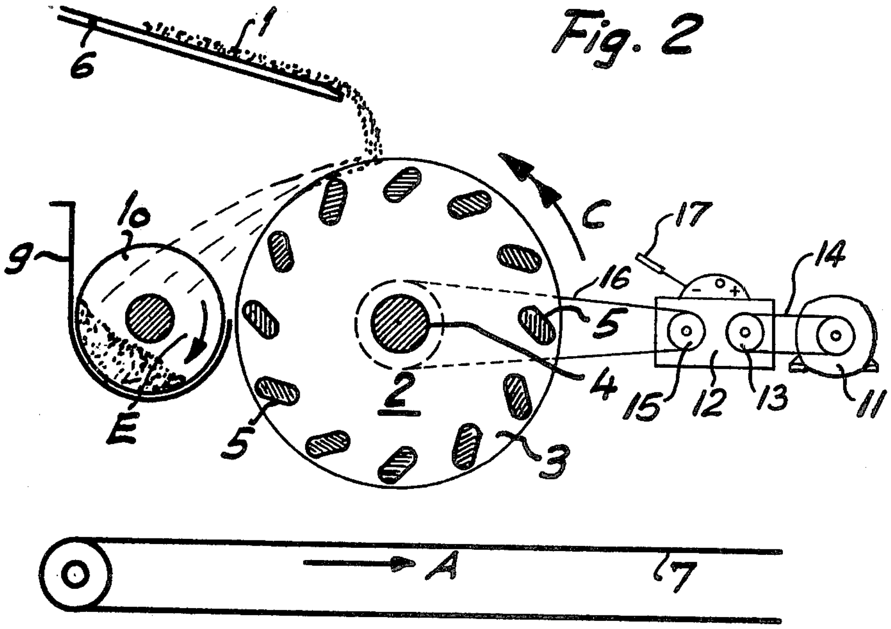
FIG. 2 is a sectional view corresponding to FIG. 1 from which the manner of operation of the apparatus during the deflection phase can be noted.

The main purpose of the conveyor worm 10 is to feed the deflected stream of particles to a testing device, not shown. It may for instance be an electronic scale. In order that the stream of particles can enter the trough 9 at all, the following measures are taken. First, the direction of rotation of the cylinder 2 is changed. This may be done, for instance, by reversing the polarity of an electric motor which drives it. Secondly, the speed of rotation of the cylinder is increased, for instance from 50 to 200 rpm. For this purpose there is particularly suited a switch by which poles of the drive motor can be connected or disconnected. More particularly, the drive unit for the cage cylinder is illustrated in FIGS. 1 and 2, and includes an electric drive motor 11 and an infinitely variable reversible gear 12, the input pulley 13 of which is coupled to the motor by means of a drive belt 14. The output pulley 15 of the gear drives the cage cylinder over a belt 16. A control lever 17 is provided for regulating the speed and direction of rotation of the cylinder 2. As shown in FIG. 1, the direction of rotation is positive, and the speed of rotation of the cage cylinder is low. As illustrated in FIG. 2, the direction of rotation of the cage cylinder is reversed (negative) and the speed of the cage cylinder is substantially higher during the monitoring mode of operation.

If the speed of rotation of the cylinder 2, which is now rotating in the direction indicated by the arrow C, is selected sufficiently high one can, surprisingly, obtain the result that the particles no longer pass into the inside of the cylinder but are impelled by the bars 5, in the manner indicated in FIG. 2. The stream of particles 1 is thus effectively deflected during a period of time of adjustable length and fed to a mechanical, pneumatic, or other means of conveyance which transports the collected particles, corresponding to the purpose in view, to a testing device or the like. In the example described, this conveying function is served by the conveyor worm 10, which now rotates in the direction of the arrow E.

What is claimed is:

1. A method for monitoring the operation of an apparatus for distributing particles in order to form a mat of particles wherein said apparatus includes a rotatable hollow cage cylinder having a perforated circumferential shell through which the particles to be distributed normally pass when the cage cylinder is rotated in a first direction, said method comprising the steps of: reversing the direction of rotation of the cylinder from said first direction and increasing the speed of rotation of the cage cylinder such that particles fed to the perforated shell cannot pass therethrough but are impelled in a different direction; capturing the impelled particles; and conveying the captured impelled particles to a measuring device for monitoring.

* * * * *